(12) United States Patent
Bando et al.

(10) Patent No.: US 10,982,104 B2
(45) Date of Patent: Apr. 20, 2021

(54) INKJET PRINTING APPARATUS AND INKJET PRINTING METHOD

(71) Applicant: MIMAKI ENGINEERING CO., LTD., Nagano (JP)

(72) Inventors: Kazuki Bando, Nagano (JP); Kazuki Ohara, Nagano (JP); Osamu Saito, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 0 days.

(21) Appl. No.: 16/596,794

(22) Filed: Oct. 9, 2019

(65) Prior Publication Data

US 2020/0115577 A1 Apr. 16, 2020

(30) Foreign Application Priority Data

Oct. 15, 2018 (JP) .............................. JP2018-194369

(51) Int. Cl.
| | |
|---|---|
| *C09D 11/101* | (2014.01) |
| *C09D 11/38* | (2014.01) |
| *C09D 11/322* | (2014.01) |
| *B41J 2/045* | (2006.01) |
| *B41J 11/00* | (2006.01) |

(52) U.S. Cl.
CPC ......... *C09D 11/101* (2013.01); *B41J 2/04571* (2013.01); *B41J 11/002* (2013.01); *C09D 11/322* (2013.01); *C09D 11/38* (2013.01); *C01P 2004/64* (2013.01)

(58) Field of Classification Search
CPC .... B41J 2/04571; B41J 2/2114; B41J 3/4073; B41J 11/002; B41J 11/0015; B41M 5/0011; C09D 11/38; C09D 11/322
See application file for complete search history.

(56) References Cited

U.S. PATENT DOCUMENTS

| | | | |
|---|---|---|---|
| 2004/0080574 A1* | 4/2004 | Masumi | ........................ 347/47 |
| 2006/0021537 A1* | 2/2006 | Ohtsu et al. | ........... B41J 11/002 |

FOREIGN PATENT DOCUMENTS

| | | |
|---|---|---|
| JP | 5614529 | 10/2014 |
| JP | 5832946 | 12/2015 |
| JP | 6038831 | 12/2016 |

* cited by examiner

*Primary Examiner* — Bradley W Thies
(74) *Attorney, Agent, or Firm* — JCIPRNET

(57) ABSTRACT

To provide an inkjet printing apparatus that improves the smoothness of the ink layer surface and improves the image quality. Provided is an inkjet printing apparatus that prints with a UV curable ink, the inkjet printing apparatus including: an ejection unit configured to eject the UV curable ink onto the surface of a print medium; and a control unit configured to control the ejection of the UV curable ink from the ejection unit, the UV curable ink containing a thixotropy-imparting agent, and the control unit setting the viscosity of the UV curable ink to 1 mPa·s to 20 mPa·s at the time of ejection and to at least 80 mPa·s within five seconds of landing on the print medium.

11 Claims, 5 Drawing Sheets

| Sample No. | A | B | C |
|---|---|---|---|
| silica (R976) | 3.6wt% | 3.0wt% | 0 |
| IBXA | 81.4wt% | 82.0wt% | 85.0wt% |
| pigment | Cyan 2.0wt% | Magenta 1.5wt% | Magenta 1.5wt% |

INKJET PRINTING APPARATUS AND INKJET PRINTING METHOD

CROSS REFERENCE TO RELATED APPLICATIONS

This application claims the priority benefit of Japanese Patent Application No. 2018-194369, filed on Oct. 15, 2018. The entirety of the above-mentioned patent application is hereby incorporated by reference herein and made a part of this specification.

TECHNICAL FIELD

The present disclosure relates to an inkjet printing apparatus and an inkjet printing method for printing by ejecting UV curable ink that is cured by emitting ultraviolet light.

BACKGROUND ART

An inkjet printing apparatus that prints a UV curable ink by ejection onto a print medium (medium) and emits ultraviolet light for curing is capable of printing onto a variety of media with a high-quality and stable image and is reliable. Such an inkjet printing apparatus also has the advantages of high-speed production because time is not needed for drying ink due to photocuring immediately after printing, and of a small installation space. However, inkjet printing has the disadvantage of poor smoothness due to the relatively large unevenness of the ejected UV curable ink on the printing face, and the printing face is generally matte (lusterless or having a matte base).

FIG. 8A is an explanatory view of an inkjet printing apparatus 201. The inkjet printing apparatus 201 is provided with a head (ejection unit) 210 for vertically ejecting UV curable ink toward a print medium 250, and an ultraviolet light source 220 for emitting ultraviolet light. The print medium 250 is mounted on a printing table 240 disposed at a position opposing the head 210, and the ejection unit 210 ejects UV curable ink droplets 260 to print on the print medium 250. When ultraviolet light 270 from an ultraviolet light source is emitted as in FIG. 8B immediately after UV curable ink 265 has landed on the print medium 250, the UV curable ink 265 cures while maintaining an ink layer surface S with large unevenness. More specifically, the ink layer surface S becomes matte.

In order to obtain a high-gloss printing face with favorable smoothness, a method can be considered in which the ink retains fluidity after landing for a longer period of time. However, if there is too much ink fluidity, the image quality deteriorates due to interference in the ink landing, i.e., mixing of the ink colors. With the current technology, there is a trade-off between improving the smoothness and improving the image quality.

When vinyl chloride is used as the medium, a solvent ink with a pigment dispersed in an organic solvent may be used instead of a UV curable ink in order to improve the weatherability, the abrasion resistance, and the adhesion. However, a strong irritant smell is produced that adversely affects the environment when the organic solvent vaporizes, time is needed for drying after printing, and the solvent resistance is low.

Patent Literature 1: Japanese Patent No. 5832946
Patent Literature 2: Japanese Patent No. 5614529
Patent Literature 3: Japanese Patent No. 6038831

SUMMARY

An ink composition has been proposed in which the internal curability of the UV curable ink is enhanced and the area near the surface of the UV curable ink layer after landing is made more susceptible to oxygen inhibition as a technique for both improving the smoothness and obtaining a favorable image quality in inkjet printing (refer to Patent Literature 1). However, with such an ink composition, the curability is low, so curing defects readily occur in the low print density portions and the coating performance may deteriorate.

Varying the ultraviolet light irradiation conditions to both improve smoothness and obtain a favorable image quality has been disclosed as another technique (refer to Patent Literature 2). However, the smoothness and image quality may be inadequate, and curing defects may also occur in the low print density portions.

Specifically, when considering, for example, the formation of an image having a glossy feel with a UV curable ink on a bent surface portion of a print medium that does not easily absorb ink, if the timing of the ultraviolet light irradiation is delayed for flattening with a conventional UV curable ink, dripping occurs and a favorable image cannot be obtained.

A technique has been disclosed in which a gelling agent is added to a UV curable ink as the ink composition, the UV curable ink is held at a high temperature during ejection to lower the viscosity, and the UV curable ink is quickly cooled to no greater than the gelling point after landing on the print medium (refer to Patent Literature 3). More specifically, the UV curable ink flows over the surface of the print medium and becomes smooth before dropping to the gelling temperature, and the ink increases in viscosity such that the colors do not mix. However, this has the disadvantage that a large heating mechanism is needed at the periphery of the head provided with the ejection unit and in the ink flow channel for stable ejection of the UV curable ink, raising the equipment costs and increasing the power consumption.

Taking such circumstances into consideration, the present disclosure provides an inkjet printing apparatus that improves the smoothness of the ink layer surface and improves the image quality.

Another approach is to increase the viscosity of the UV curable ink. However, if an inkjet printing method is used, a low viscosity of, for example, tens of mPa·s is needed to eject a small volume of droplets. However, when, with such a low viscosity, the time for curing on the print medium is lengthened for flattening, it is difficult to avoid a reduction in the image quality due to color mixing since the initial viscosity is too low. Therefore, the present disclosure uses an ink composition in which the viscosity is increased after the ink lands on the print medium.

(1) The present disclosure provides an inkjet printing apparatus that prints with a UV curable ink, the inkjet printing apparatus including: an ejection unit configured to eject the UV curable ink onto a surface of a print medium; and a control unit configured to control an ejection of the UV curable ink from the ejection unit, the UV curable ink containing a thixotropy-imparting agent, and the control unit setting a viscosity of the UV curable ink to 1 mPa·s to 20 mPa·s at a time of the ejection and to at least 80 mPa·s within five seconds of landing on the print medium.

The term "thixotropy" refers to a property in which the viscosity drops when a high shear stress is continuously received and the viscosity increases when there is a drop in the shear stress. When, for example, particles of a substance with mutual hydrogen bonds are added to a liquid, a state is maintained in which the viscosity increases with the mutual hydrogen bonds maintained if the liquid is not stirred, but the hydrogen bonds are broken if the liquid is stirred, causing the viscosity to drop. When ink is pressed out from a nozzle in the ejection unit of the inkjet printing apparatus, a large shear stress is applied to the ink.

In the disclosure described in (1), the UV curable ink contains a thixotropy-imparting agent and so has a viscosity low enough before ejection to enable ejection, and has the property that the viscosity increases after ejection when a high shear stress is not applied after the landing on the printed medium. As a result, such an ink has a fluidity for flattening immediately after landing on the print medium but also has an increase in viscosity over the passage of time, and therefore an excellent effect is exhibited in which a drop in image quality due to the mixing of colors caused by ink dispersion does not occur easily.

In the disclosure described in (1), the viscosity of the UV curable ink at the time of the ejection is 1 mPa·s to 20 mPa·s, so that ejection from the ink ejection unit is possible and the viscosity, when there is a low shear (0.1 (1/s)), is at least 80 mPa·s within five seconds of the landing on the print medium, and therefore an excellent effect is exhibited in which the viscosity increases so that colors do not easily mix after the ink is flattened on the print medium.

(2) The present disclosure provides the inkjet printing apparatus described in (1), in which a high shear stress is applied to the UV curable ink at the time of the ejection.

In the disclosure described in (2), the UV curable ink contains a thixotropy-imparting agent, and therefore an excellent effect is exhibited in which the viscosity is low enough at the time of ejection that ejection is possible.

(3) The present disclosure provides the inkjet printing apparatus described in (1) or (2), in which the UV curable ink further contains a colorant.

In the disclosure described in (3), because the UV curable ink, the colors of which do not easily mix, can be used, an excellent effect is exhibited in which drips do not easily occur even when printing is on, for example, a curved surface, and full-color printing with a glossy feel is possible.

(4) The present disclosure provides the inkjet printing apparatus described in any of (1) to (3), in which the UV curable ink contains inorganic particles.

In the disclosure described in (4), an excellent effect is exhibited in which an inexpensive thixotropy-imparting agent with good dispersion is achieved.

(5) The present disclosure provides the inkjet printing apparatus described in (4), in which the inorganic particles contain silica.

Silica, particularly fumed silica produced with a method of the flame hydrolysis of silicon tetrachloride known as the dry method, imparts thixotropy through the formation of a three-dimensional network structure in a liquid resulting from the mutual hydrogen bonds of silanol groups on the silica particle surface. In the disclosure described in (5), thixotropy is acquired by using silica in the UV curable ink, and therefore an excellent effect is exhibited in which two problems ordinarily difficult to solve at the same time are solved, that is, flattening is possible but colors are not easily mixing.

(6) The present disclosure provides the inkjet printing apparatus described in (5), in which the UV curable ink contains 1 wt % to 10 wt % of silica particles having: an average primary grain size of 7 nm to 16 nm, and a surface modified with dimethylsilyl or dimethylpolysiloxane.

In the disclosure described in (6), an excellent effect is exhibited in which the silica particles are made hydrophobic by surface-modification with dimethylsilyl or dimethylpolysiloxane, and even when a polar acrylic monomer, for example, is used as a diluent, increased viscosity is attained, and therefore, two problems ordinarily difficult to solve at the same time are solved, that is, flattening is possible but colors are not easily mixing after the landing on the print medium.

(7) The present disclosure provides the inkjet printing apparatus described in any of (1) to (6), in which a printed matter created by the inkjet printing apparatus is, after printing, pasted with a laminate film.

If the smoothness of the ink layer surface is poor, when the laminate film is pasted on the surface of the printed matter for protection, fine air bubbles are caught along the unevenness of the ink surface layer, and visible defects called silver rings occur. In the disclosure described in (7), the smoothness of the ink layer surface is improved, so an excellent effect is exhibited in which silver rings are suppressed.

(8) The present disclosure provides the inkjet printing apparatus described in any of (1) to (7), in which a printed matter created by the inkjet printing apparatus has a curved portion that is a surface of the print medium with curvature.

In the disclosure described in (8), the viscosity becomes at least 80 mPa·s within five seconds of the landing on the print medium, so an excellent effect is exhibited in which drips do not occur and the printing affixes even if the surface of the print medium has curvature.

(9) The present disclosure provides an inkjet printing method including: an ejection step of ejecting a UV curable ink, the UV curable ink containing a thixotropy-imparting agent.

In the disclosure described in (9), the UV curable ink contains a thixotropy-imparting agent and so has a viscosity low enough before ejection to enable ejection, and has the property that the viscosity increases after ejection when a shear stress is not applied after the landing on the printed medium. As a result, such an ink has a fluidity for flattening after landing on the print medium but also has an increase in viscosity over the passage of time, and therefore an excellent effect is exhibited in which a drop in image quality due to the mixing of colors caused by ink dispersion does not easily occur.

The inkjet printing method described in (9) may be considered as a method for producing printed matter.

The inkjet printing apparatus and the inkjet printing method according to the disclosures described in (1) to (9) obtain an excellent effect, in which both flattening of the ink layer surface and high image quality are achieved.

DESCRIPTION OF EMBODIMENTS

Figure 1A:
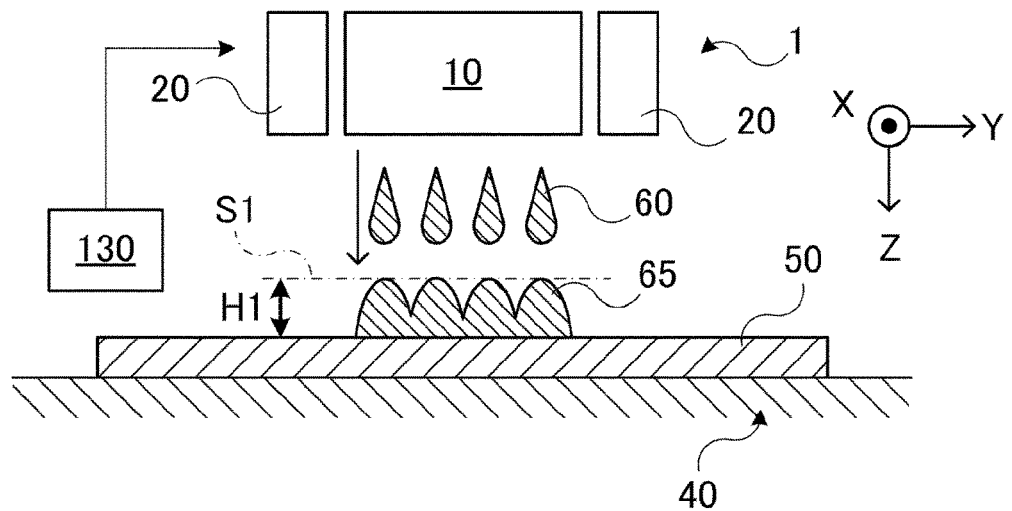
FIG. 1A is an explanatory view of ink ejection by the inkjet printing apparatus in an embodiment of the present disclosure.
Figure 1B:
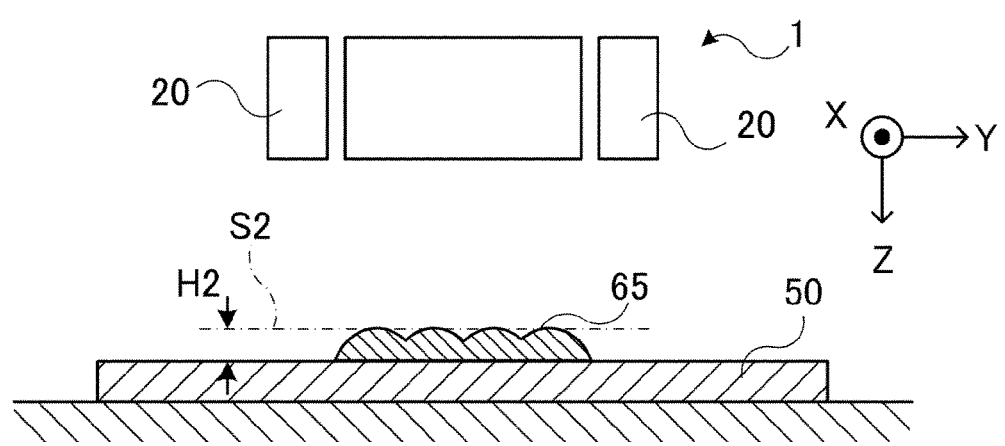
FIG. 1B is an explanatory view of a mode in which UV curable ink is flattened after landing on a print medium.
Figure 1C:
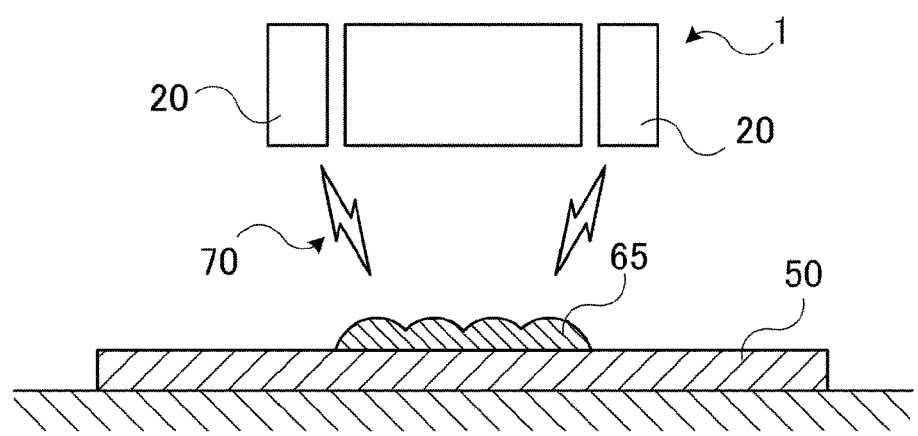
FIG. 1C is an explanatory view of an operation in which ultraviolet light is emitted on flattened UV curable ink for curing.

Embodiments of the present disclosure are described below with reference to the drawings.

FIGS. 1A to 7 are an example of a mode for working the disclosure, and the same reference signs are used for the same parts in the drawings. In the drawings, some features are omitted, as appropriate, to simplify the drawings. The size, shape, thickness and other features of members may be expressed in an exaggerated fashion, as appropriate.

FIG. 1A is an explanatory view of ink ejection by the inkjet printing apparatus in the embodiment of the present disclosure. The inkjet printing apparatus 1 is provided with a head (ejection unit) 10 for vertically ejecting UV curable ink droplets 60 onto a print medium 50, an ultraviolet light source 20 for emitting ultraviolet light, a control unit 130 configured to control the entire inkjet printing apparatus 1, and a printing table 40 disposed at a position opposing the head (ejection unit) 10 for supporting the print medium 50.

The center wavelength of the light emitted by the ultraviolet light source 20 is 365 nm to 410 nm, and an LED with a center wavelength of light of 365 nm, for example, is desirable as the light source.

The head 10 carries out a two-dimensional scan in the XY plane in the drawing. In further detail, the head 10 is driven by a main scanning driver (illustration omitted) in the Y direction in the drawing, which is a predetermined main scanning direction, and carries out a main scanning operation. A main scanning operation is an operation in which the head 10 ejects the UV curable ink droplets 60 while moving in the main scanning direction relative to the printed matter being printed. The head 10 is also driven by a sub-scanning driver (illustration omitted) in the X direction in the drawing, which is the sub-scanning direction, and carries out a scan. The drivers, i.e., the scanning driver and the sub-scanning driver, that move the head 10 are controlled by the control device 130. The structure of the inkjet printing apparatus 1 is known technology and therefore a detailed explanation is omitted.

The inkjet printing apparatus 1 is optionally provided with a heating unit for heating the print medium 50. Depending on the sort of combination of the monomer composing the ink and the print medium 50, a smoothing promotion effect may be obtained due to the effect of the ink penetrating into the print medium 50 when the print medium 50 is heated.

In the present embodiment, the UV curable ink droplets 60 are ejected downward in the Z direction in the drawing from a nozzle provided in the ejection unit 10, and the UV curable ink droplets 60 land on the surface of the print medium 50 to form a layer of ink like the UV curable ink 65. A piezoelectric element or the like provided for ejection applies a high shear stress on the UV curable ink in the ejection unit 10. More specifically, a high shear stress of, for example, 10000 (1/s) is applied to the ink inside the ejection unit 10. The viscosity of the UV curable ink is, for example, 1 mPa·s to 20 mPa·s.

The UV curable ink droplets 60 ejected from the ejection unit 10 and landed on the print medium 50 are in a state in which a low shear stress of, for example, 0.1 (1/s) is applied. The viscosity of the UV curable ink becomes 80 mPa·s within five seconds of landing on the print medium 50. After the landing, the UV curable ink is flattened (refer to FIG. 1B), and then ultraviolet light 70 is emitted from the ultraviolet light source 20 to cure the UV curable ink 65 (refer to FIG. 1C). An ink layer surface S2 after flattening has less unevenness than an ink layer surface S1 before flattening, and a height H2 of the ink after flattening is lower than a height H1 of the ink before flattening. However, after the UV curable ink droplets 60 land on the print medium 50, the viscosity increases due to the thixotropy, and the colors do not easily mix even if there is flattening to a certain degree.

In order to impart such thixotropy to the UV curable ink, a thixotropy-imparting agent is used in the UV curable ink.

Specifically, the UV curable ink contains inorganic particles as the thixotropy-imparting agent, and the inorganic particle contain silica. The silica is preferably fumed silica produced with a method of flame hydrolysis of silicon tetrachloride known as the dry method.

The silica is desirably hydrophobic silica particles having an average primary grain size of, for example, 7 nm to 16 nm, and modified on the surface with, for example, dimethylsilyl or dimethylpolysiloxane. The UV curable ink contains 1 wt % to 10 wt % of the silica particles.

The UV curable ink optionally further contains a coloring material (coloring matter). The main composition of the UV curable ink is explained next.

In general, the UV curable ink contains a polymerizable compound, a diluent monomer, a photopolymerization initiator, an additive, and a coloring matter. In order to carry out inkjet printing, a low viscosity is needed such that appropriate ejection from the ejection unit 10 is possible.

More specifically, the UV curable ink 65 contains a monomer or an oligomer as the polymerizable compound and as the diluent monomer. In further detail, the monomer is a monofunctional monomer or a multifunctional polymer.

Examples of the monofunctional monomer that can be favorably used in the present disclosure include known acrylate monomers. Examples include monofunctional monomers such as hexyl acrylate, 2-ethylhexyl acrylate, tert-octyl acrylate, isoamyl acrylate, decyl acrylate, isodecyl acrylate, cyclohexyl acrylate, 4-n-butyl cyclohexyl acrylate, bornyl acrylate, isobornyl acrylate, benzyl acrylate, lauryl acrylate, 2-hydroxyethyl acrylate, 2-hydroxypropyl acrylate, 2-acryloyloxy ethyl succinate, tetrahydrofurfuryl acrylate, and phenoxyethyl acrylate.

Specific examples of the photopolymerization initiator favorably used in the present disclosure include acetophenone, 2,2-diethoxyacetophenone, p-dimethylaminoacetophenone, benzophenone, 2-chlorobenzophenone, p,p'-dichlorobenzophenone, p,p'-bis diethylamino benzophenone, Michler's ketone, benzyl, benzoin, benzoin methyl ether, benzoin ethyl ether, benzoin isopropyl ether, benzoin-n-propyl ether, benzoin isobutyl ether, benzoin-n-butyl ether, benzyl methyl ketal, 2,2-dimethoxy-1,2-diphenylethane-1-one, 1-hydroxycyclohexyl phenyl ketone, 2-hydroxy-1-{4-[4-(2-hydroxy-2-methyl propionyl)benzyl]phenyl}2-methylpropane-1-one, 2-benzyl-2-dimethylamino-1-(4-morpholinophenyl)butanone-1, 2-dimethylamino-2-(4-methylbenzyl)-1-(4-morpholine-4-yl-phenyl)butane-1-one, 2,4,6-trimethylbenzoyl diphenylphosphine oxide, bis(2,4,6-trimethylbenzoyl)phenylphosphine oxide, bis(2,6-dimethoxybenzoyl)-2,4,4-trimethylpentyl phosphine oxide, 2-methyl-1-[4-(methylthio)phenyl]2-morpholinopropane-1-one, thioxanthone, 2-chlorothioxanthone, 2-hydroxy-2-methyl-1-phenyl-1-one, 1-(4-isopropylphenyl)-2-hydroxy-2-methylpropane-1-one, methylbenzo fill formate, azobisisobutyronitrile, benzoyl peroxide, and di-tert-butyl peroxide.

Examples of coloring matters that may be favorably used in the present disclosure include dyes and pigments, and an organic or inorganic pigment may be used as the pigment.

Examples of red and magenta pigments that may be used include Pigment Reds 3, 5, 19, 22, 31, 38, 43, 48:1, 48:2, 48:3, 48:4, 48:5, 49:1, 53:1, 57:1, 57:2, 58:4, 63:1, 81, 81:1, 81:2, 81:3, 81:4, 88, 104, 108, 112, 122, 123, 144, 146, 149, 166, 168, 169, 170, 177, 178, 179, 184, 185, 208, 216, 226, and 257, Pigment Violets 3, 19, 23, 29, 30, 37, 50, and 88, and Pigment Oranges 13, 16, 20, and 36.

Examples of blue and cyan pigments that may be used include Pigment Blues 1, 15, 15:1, 15:2, 15:3, 15:4, 15:6, 16, 17-1, 22, 27, 28, 29, 36, and 60.

Examples of green pigments that may be used include Pigment Greens 7, 26, 36, and 50.

Examples of yellow pigments that may be used include Pigment Yellows 1, 3, 12, 13, 14, 17, 34, 35, 37, 55, 74, 81, 83, 93, 94, 95, 97, 108, 109, 110, 137, 138, 139, 153, 154, 155, 157, 166, 167, 168, 180, 185, and 193.

Examples of black pigments that may be used, according to the purpose, include Pigment Blacks 7, 28, and 26.

[First Embodiment]

An embodiment is described below in detail, but the modes of the present disclosure are not limited to this embodiment.

The UV curable ink contains the following.

Thixotropy-imparting agent: fumed silica (AEROSIL (registered trademark) R976 (surface-treated with dimethyldichlorosilane) manufactured by NIPPON AEROSIL CO., LTD.)

Polymerizable compound: IBXA (isobornyl acrylate)

Photopolymerization initiator: TPO (2,4,6-trimethylbenzoyl diphenylphosphine oxide)

Sensitizer: DETX (2,4-diethylthioxanthone-9-one)

Coloring matter (pigment)

Vinyl chloride (Hakuenbi G-137-50 SPC0706 manufactured by MIMAKI ENGINEERING CO., LTD.) was used as the print medium.

Figures 2, 3:
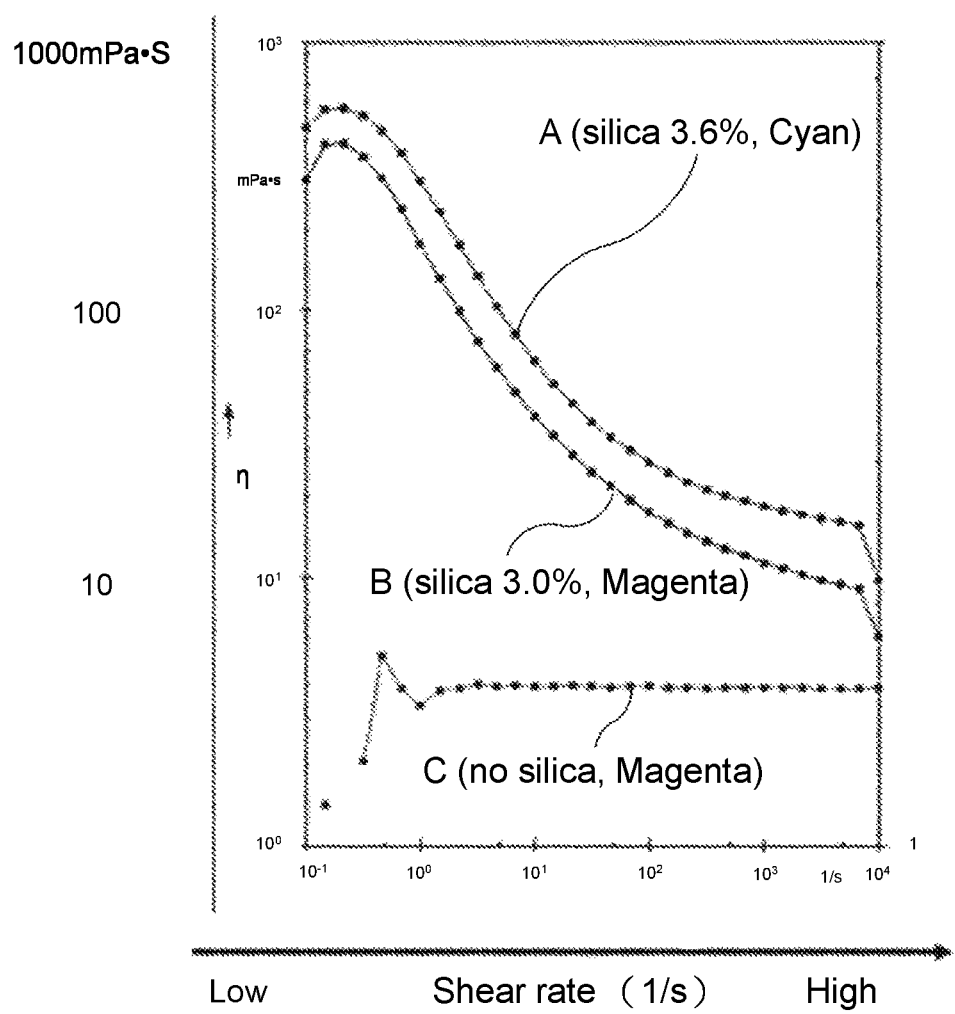
FIG. 2 is a table showing the compositions of three UV curable inks (sample A, sample B, and sample C) used in the embodiment.
FIG. 3 is an experiment result showing the dependency of viscosity on the shear rate in sample A, sample B, and sample C measured with a rheometer (dynamic viscoelasticity measuring instrument).

FIG. 2 is a mixture table of sample A, sample B, and sample C, which are UV curable inks used in an experiment. In further detail, sample A and sample B contain silica particles R976 as a thixotropy-imparting agent, and sample C does not contain a thixotropy-imparting agent.

FIG. 3 is an experiment result showing the dependency of viscosity on the shear rate in sample A, sample B, and sample C measured with a rheometer (dynamic viscoelasticity measuring instrument). The vertical axis is the viscosity (unit: Mpa·s) and the horizontal axis is the shear rate (unit: 1/s). Thixotropy appears in sample A and sample B containing the silica particles. More specifically, in a state with a low shear rate, i.e., a state in which the shear stress on the UV curable ink, which is a sample, is low, the viscosity is at least 100 mPa·s, and in a state with a high shear rate, i.e., a state in which the shear stress on the UV curable ink, which is a sample, is high, the viscosity is 20 mPa·s or less. In contrast, in sample C not containing silica particles, the dependency of the viscosity on the shear rate is low and the viscosity is about 10 mPa·s.

Figure 4:
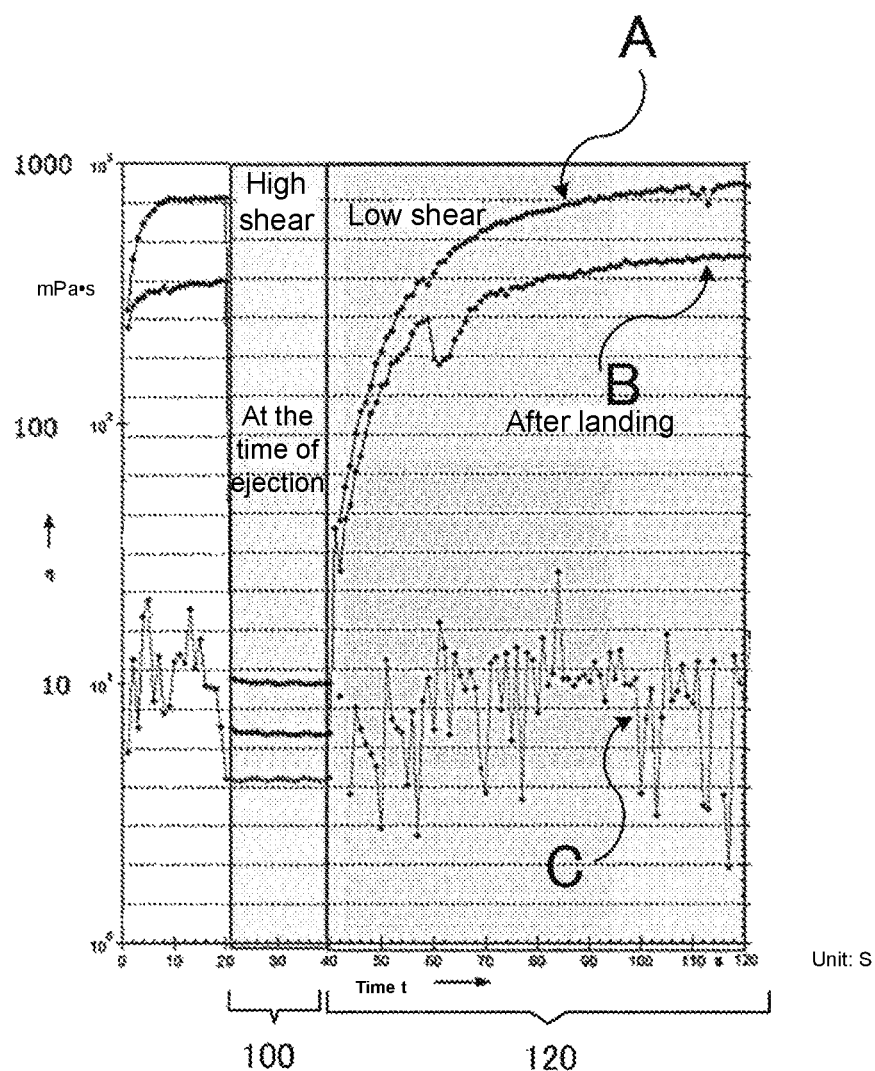
FIG. 4 is an experiment result showing the approximate dependency of viscosity on time in sample A, sample B, and sample C before ejection and after landing on the print medium measured with a rheometer (dynamic viscoelasticity measuring instrument).

FIG. 4 is an experiment result showing the dependency of viscosity on time in sample A, sample B, and sample C before ejection and after landing on the print medium measured with a rheometer (dynamic viscoelasticity measuring instrument). The vertical axis indicates viscosity (unit: mPa·s) and the horizontal axis indicates the passage of time, but a high shear stress is applied to the UV curable ink before ejection (at the time of ejection) 100, and the shear stress applied to the UV curable ink after the landing 120 on the print medium is low. In the state before ejection 100, the viscosity of each of sample A, sample B, and sample C is small, about 10 mPa·s. In the state after the landing 120 on the print medium 50 after ink ejection, the viscosity increases with the passage of time in sample A and sample B, which include silica particles as a thixotropy-imparting agent. More specifically, the viscosity approximately five seconds after the landing is at least 80 mPa·s and increases with the passage of time. In contrast, in sample C, which does not contain a thixotropy-imparting agent, the viscosity remains low, approximately 10 mPa·s, with little change before the ejection 100 and after the landing 120 on the print medium.

An MCR 302 manufactured by Anton Paar was used as the rheometer for measuring the viscosity in the present embodiment.

Figure 5A:
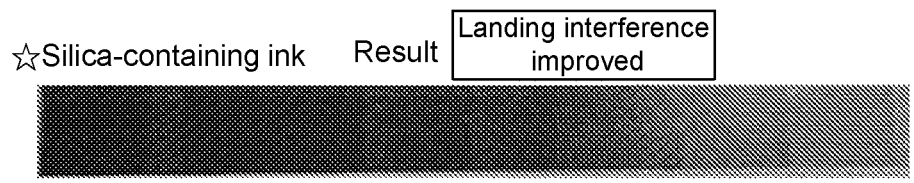
FIG. 5A is the result of printing with a silica-containing ink.
Figure 5B:
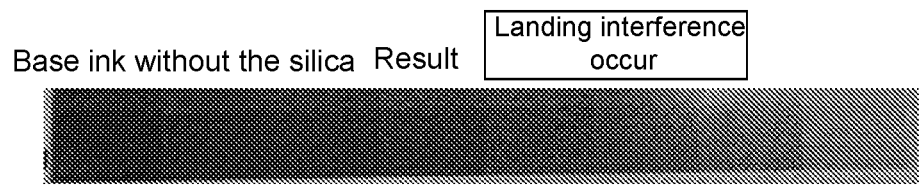
FIG. 5B is the result of printing with a non-silica-containing ink.

FIG. 5A is the print result using a silica-containing ink. There is little mixing of the ink colors because there is no landing interference by the ink after landing, and therefore the print result is clear regardless of the print density. In contrast, FIG. 5B is the print result using an ink without silica. There is landing interference by the ink after landing, blurring occurs in the printing particularly where there is low print density, and the print result overall has much printing non-uniformity.

Figure 6A:
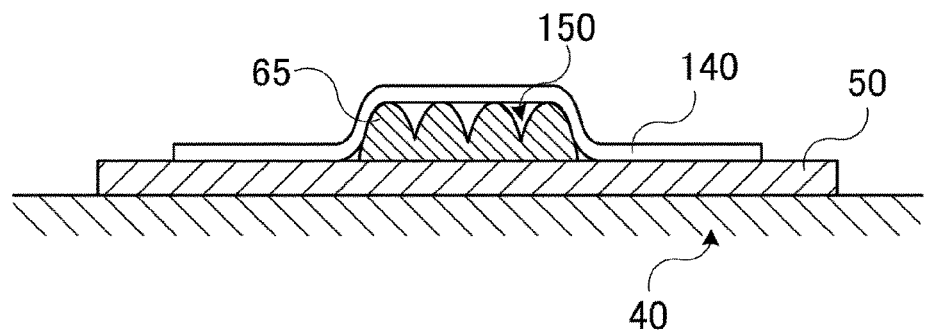
FIG. 6A is an explanatory view of a mode in which a UV curable ink not containing a thixotropy-imparting agent is printed and cured, and then a laminate film is pasted onto the printing face.

FIG. 6A is an explanatory view of a mode in which a UV curable ink not containing a thixotropy-imparting agent is printed and cured, and then a laminate film is pasted onto the printing face. More specifically, after printing, the printed matter created by the inkjet printing apparatus 1 is pasted with a laminate film 140. With the UV curable ink 65 printed onto the print medium 50, the unevenness of the ink layer surface is large and air bubbles 150 are produced between the printing face and the laminate film 140. Such air bubbles 150 produce visual defects called "so-called silver rings". In specific detail, the printing appears whitish.

Figure 6B:
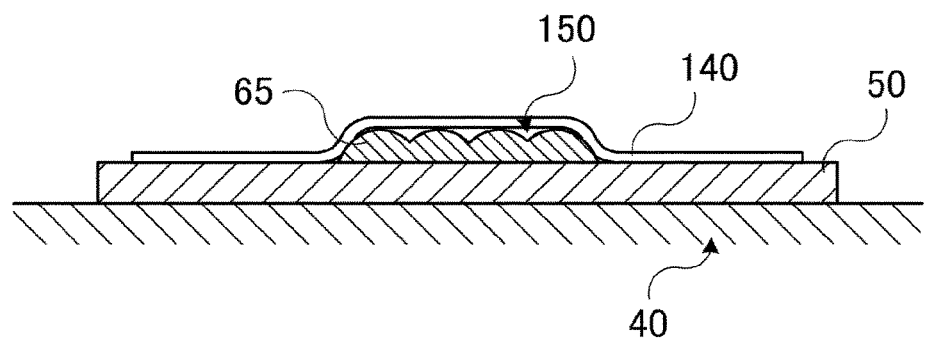
FIG. 6B is an explanatory view of a mode in which a UV curable ink containing a thixotropy-imparting agent is printed and cured after waiting for flattening, and then a laminate film is pasted onto the printing face.

In contrast, FIG. 6B is an explanatory view of a mode in which a UV curable ink containing a thixotropy-imparting agent is printed and cured after waiting for flattening, and then a laminate film is pasted onto the printing face. The UV curable ink 65 maintains a low viscosity after landing and before curing, so there is little surface unevenness after some flattening. Therefore, there are few air bubbles between the laminate film 140 and the cured UV curable ink 65, and the visual defects called silver rings do not easily occur.

Figure 7:
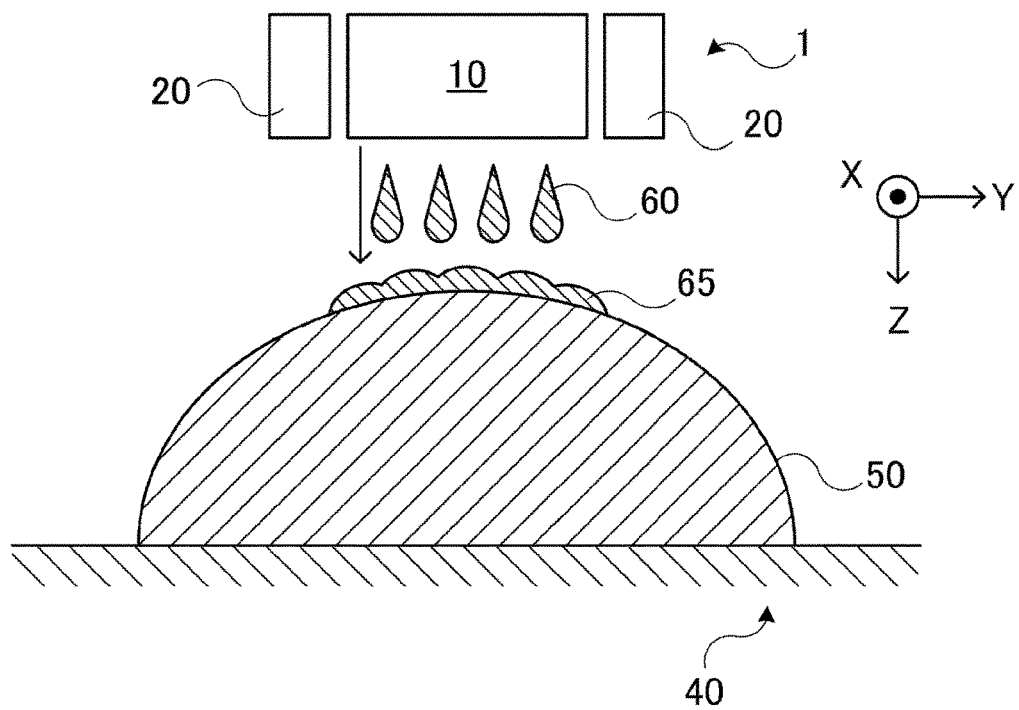
FIG. 7 is an explanatory view for explaining a printing mode when the print medium has a curvature.
Figure 8A:
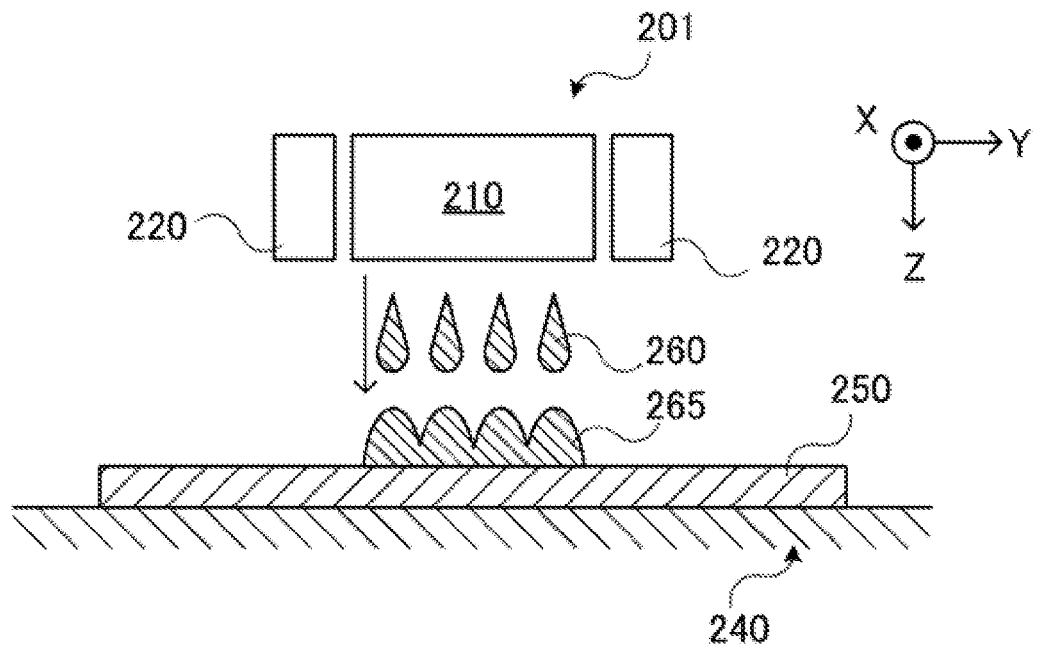
FIG. 8A is an explanatory view of ink ejection by the inkjet printing apparatus.
Figure 8B:
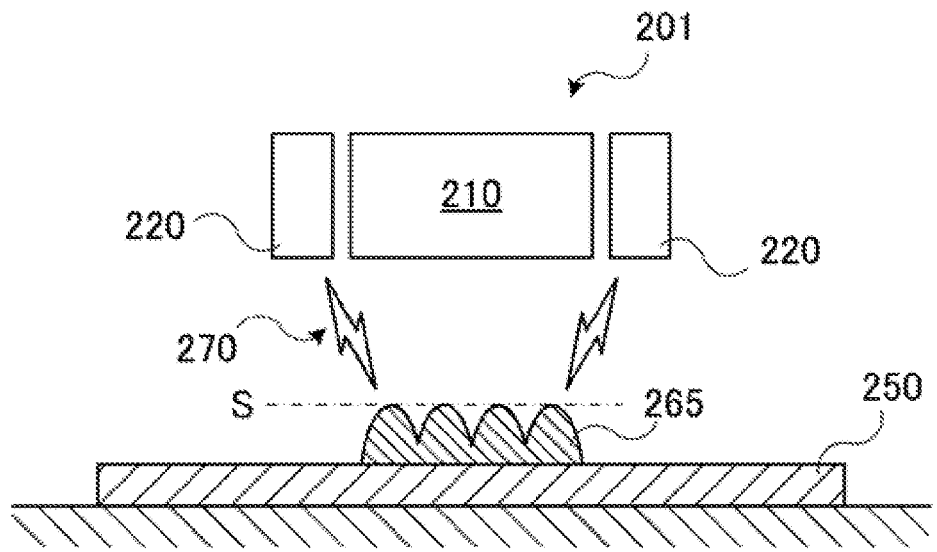
FIG. 8B is an explanatory view showing a mode in which UV curable ink is cured while unevenness in the ink surface is maintained.

FIG. 7 is an explanatory view for explaining a printing mode carried out by the inkjet printing apparatus 1 when the print medium has a curvature. The UV curable ink droplets 60 ejected downward in the Z direction from the ejection unit 10 land and affix to the surface of the print medium 50 having curvature. The UV curable ink of the inkjet printing apparatus 1 in the present embodiment reaches a viscosity of at least 80 mPa·s within five seconds of the landing, and therefore neither drips due to gravity nor color mixing occur easily.

In the inkjet printing apparatus 1 in the present embodiment, the UV curable ink 65 contains a thixotropy-imparting agent and so has a viscosity low enough before ejection to enable ejection, and has the property that the viscosity increases after ejection when a high shear stress is not applied after the landing on the printed medium 50. As a result, such an ink has a fluidity for flattening after landing on the print medium 50 but also has an increase in viscosity over the passage of time, and therefore an excellent effect is exhibited in which a drop in image quality due to the mixing of colors caused by ink dispersion does not occur easily.

Because the UV curable ink 65, the colors of which do not easily mix, can be used in the inkjet printing apparatus 1 in the present embodiment, an excellent effect is exhibited in which drips do not easily occur even if printing is on, for example, a curved surface, and full-color printing with a glossy feel is possible.

In the inkjet printing apparatus 1 in the present embodiment, an excellent effect is exhibited in which an inexpensive thixotropy-imparting agent with good dispersion can be achieved.

Silica, particularly fumed silica produced with a method of the flame hydrolysis of silicon tetrachloride known as the dry method, imparts thixotropy through the formation of a three-dimensional network structure in a liquid resulting from the mutual hydrogen bonds of silanol groups in the silica particle surface. In the inkjet printing apparatus 1 in the present embodiment, thixotropy is attained by using silica in the UV curable ink 65, and therefore an excellent effect is exhibited in which two problems ordinarily difficult to solve at the same time are solved, that is, flattening is possible and colors are not easily mixing.

In the inkjet printing apparatus 1 in the present embodiment, the silica particles are made hydrophobic by surface-modification with dimethylsilyl or dimethylpolysiloxane, and increased viscosity is attained even when a polar acrylic monomer, for example, is used as a diluent, and therefore an excellent effect is exhibited in which two problems ordinarily difficult to solve at the same time are solved, that is, flattening is possible and colors are not easily mixing after the landing on the print medium.

In the inkjet printing apparatus 1 in the present embodiment, the viscosity of the UV curable ink 65 when there is a high shear stress (10000 (l/s)) is 1 mPa·s to 20 mPa·s, so that ejection from the ink ejection unit 10 is possible and the viscosity, when there is a low shear stress (0.1 (l/s)), is at least 80 mPa·s within five seconds of the landing on the print medium 50, and therefore an excellent effect is exhibited in which the viscosity increases so that colors do not easily mix after the UV curable ink 65 is flattened on the print medium 50.

If the smoothness of the ink layer surface is poor, when the laminate film 140 is pasted on the surface of the printed matter for protection, fine air bubbles are caught along the unevenness of the ink surface layer, and visible defects called silver rings occur. In the inkjet printing apparatus 1 of the present embodiment, the smoothness of the ink layer surface is improved, so an excellent effect is exhibited in which silver rings are suppressed.

In the inkjet printing apparatus 1 of the present embodiment, at least 80 mPa·s is reached within five seconds of the landing on the print medium 50, so an excellent effect is exhibited in which drips do not occur and the printing affixes even if the surface of the print medium 50 has curvature.

The inkjet printing apparatus and the inkjet printing method of the present disclosure are not limited to the embodiment described above and may, of course, be variously modified within a scope that does not deviate from the gist of the present disclosure.

What is claimed is:

1. An inkjet printing apparatus that prints with an ultraviolet (UV) curable ink, the inkjet printing apparatus comprising:
    an ejection unit configured to eject the UV curable ink onto a surface of a print medium; and
    a control unit configured to control an ejection of the UV curable ink from the ejection unit,
    wherein the UV curable ink contains a thixotropy-imparting agent, and
    the control unit is configured so that a shear stress is applied to the UV curable ink at a time of the ejection to obtain a viscosity of 1 mPa·s to 20 mPa·s, and
    the UV curable ink has a viscosity of at least 80 mPa·s within five seconds of landing on the print medium;
    the UV curable ink contains inorganic particles;
    the inorganic particles contain silica.

2. The inkjet printing apparatus according to claim 1, wherein
    the UV curable ink further contains a colorant.

3. The inkjet printing apparatus according to claim 2, wherein
    the UV curable ink contains 1 wt % to 10 wt % of silica particles having: an average primary grain size of 7 nm to 16 nm, and a surface modified with dimethylsilyl or dimethylpolysiloxane.

4. The inkjet printing apparatus according to claim 1, wherein
    the UV curable ink contains 1 wt % to 10 wt % of silica particles having: an average primary grain size of 7 nm to 16 nm, and a surface modified with dimethylsilyl or dimethylpolysiloxane.

5. The inkjet printing apparatus according to claim 1, wherein
    a printed matter created by the inkjet printing apparatus is, after printing, pasted with a laminate film.

6. The inkjet printing apparatus according to claim 1, wherein
    a printed matter created by the inkjet printing apparatus has a curved portion that is a surface of the print medium with curvature.

7. An inkjet printing apparatus that prints with an ultraviolet (UV) curable ink, the inkjet printing apparatus comprising:
    an ejection unit configured to eject the UV curable ink onto a surface of a print medium; and
    a control unit configured to control an ejection of the UV curable ink from the ejection unit,
    wherein the UV curable ink contains a thixotropy-imparting agent, and
    the control unit is configured so that a shear stress is applied to the UV curable ink at a time of the ejection to obtain a viscosity of 1 mPa·s to 20 mPa·s, and
    the UV curable ink has a viscosity of at least 80 mPa·s within five seconds of landing on the print medium;
    the UV curable ink contains inorganic particles;
    the inorganic particles contain silica;

a shear stress of at least 10000 (1/s) is applied to the UV curable ink at the time of the ejection.

8. The inkjet printing apparatus according to claim 7, wherein
the UV curable ink further contains a colorant.

9. The inkjet printing apparatus according to claim 8, wherein
the UV curable ink contains 1 wt % to 10 wt % of silica particles having: an average primary grain size of 7 nm to 16 nm, and a surface modified with dimethylsilyl or dimethylpolysiloxane.

10. The inkjet printing apparatus according to claim 7, wherein
the UV curable ink contains 1 wt % to 10 wt % of silica particles having: an average primary grain size of 7 nm to 16 nm, and a surface modified with dimethylsilyl or dimethylpolysiloxane.

11. An inkjet printing method, comprising:
an ejection step of ejecting an ultraviolet (UV) curable ink,
wherein the UV curable ink contains a thixotropy-imparting agent;
the UV curable ink is applied with a shear stress at a time of ejection to obtain a viscosity of 1 mPa·s to 20 mPa·s;
the UV curable ink has a viscosity of at least 80 mPa·s within five seconds of landing on a print medium; and
the UV curable ink contains inorganic particles that contain silica.

* * * * *